Jan. 20, 1931.  R. R. MACHLETT  1,789,557
LUMINOUS TUBE
Filed Dec. 14, 1928

Raymond R. Machlett
INVENTOR

BY
ATTORNEY

Patented Jan. 20, 1931

1,789,557

UNITED STATES PATENT OFFICE

RAYMOND R. MACHLETT, OF NEW YORK, N. Y., ASSIGNOR TO RAINBOW LIGHT, INC., OF LONG ISLAND CITY, NEW YORK, A CORPORATION OF NEW YORK

LUMINOUS TUBE

Application filed December 14, 1928. Serial No. 326,114.

The luminous tubes to which my invention relates are those employing a rarefied gas which is caused to become luminescent under the effect of an electrical current applied to interior electrodes.

In tubes of this kind it is sometimes desired to seal within the glass tube another tube of quartz in such a way that the entire discharge between the electrodes must pass through the quartz tube and none of it leak between the external glass tube and internal quartz tube.

The making of a sufficiently tight seal to prevent leakage has always been a difficult matter because of the widely different coefficients of expansion of glass and quartz. Because of this difference it has been practically impossible to make an effective seal between an external glass tube and an internal quartz tube.

My invention solves this difficulty and provides a seal between a luminous glass tube and an internal quartz tube which will effectively prevent electrical leakage and will maintain an electrically tight joint between the two, irrespective of their different rates of expansion.

In order that the invention may be readily understood attention is directed to the accompanying drawing showing a luminous tube with a quartz tube sealed therein by means which comprises my invention.

Figure 1:
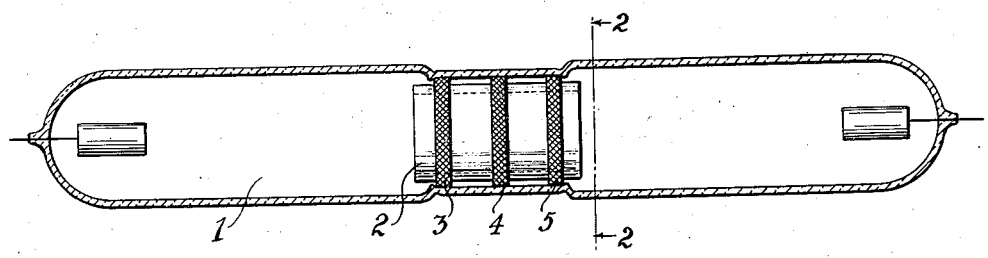
Figure 2:
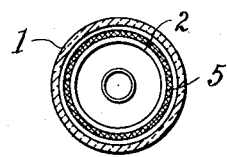

Fig. 1 is a longitudinal cross-section of a tube embodying my invention and Fig. 2 is a transverse section of the tube of Fig. 1 at line 2—2.

The luminous tube proper equipped with the usual internal electrodes is shown at 1. A quartz tube 2, through which the entire luminous discharge is to pass, is sealed within it. The external diameter of the quartz tube is somewhat smaller than the internal diameter of that portion of the glass tube into which it is to be sealed. Sealing is effected by means of two or more annular rings 3, 4 and 5 made of metallic gauze, such as copper or iron. These rings are placed around the quartz tube as shown and are of such internal and external dimensions that they fit snugly the outside of the quartz tube and the inside of the glass tube, thus holding the quartz tube in position in spaced relation to the glass tube. The resilient nature of these rings permits them to compress or expand as the case may be, so that they will always maintain contact with the two tubes, as above described, irrespective of the variations in the diameter of the tubes caused by changes in temperature.

Obviously such a seal is a poor one mechanically, but electrically it is perfect for the following reasons. The succeeding pair of rings, as for example, rings 3 and 4 and 4 and 5 together with the annular spaces between them comprise small discharge tubes, the rings forming the electrodes thereof. Thus the two rings 3 and 4 are the electrodes for a small tube consisting of these two rings and the space between them. Similarly the rings 4 and 5 form the electrodes of a similar small discharge tube.

All of these small tubes are in series. It is characteristic of luminous tubes of the class described that in operation a large drop in potential occurs at the cathode which is substantially independent of the distance between the cathode and the anode. This being so the cathode drop in potential of each of the small tubes, constructed as above described, will be found to be substantially the same as that of the luminous tube. Since these small tubes are in series their total drop in potential will be the sum of their individual drops in potential and the total drop in potential of the series of small tubes will be greater than the drop in potential between the main electrodes of the luminous tube proper. Consequently, a highly effective seal against electrical leakage between the glass and the quartz tube is effected by my invention, by means which I believe to be distinctly novel.

It is important that the actual space between the metal rings and the walls of the glass and quartz tubes be very small. These spaces should be in the order of the mean free path of the atoms of the gas within the tube and preferably less than this value. If this precaution is followed no discharge in the interspace can ever become started.

Having now described my invention, what

I claim as new therein and desire to secure by Letters Patent is as follows:

1. A luminous tube, comprising a glass envelope, a cathode and an anode therein, a quartz tube within said glass envelope, said quartz tube being spaced from said glass envelope by resilient electrically conductive rings, said rings being spaced apart from each other.

2. Means for securing a quartz tube within a luminous discharge tube of glass, comprising a multiplicity of electrically conductive rings spaced apart from one another and maintaining the quartz and glass tubes in spaced relation.

3. A luminous discharge tube, comprising an external transparent envelope, a cathode and an anode therein, a tube of different insulating material than the external envelope therein, said tube being spaced from said envelope by means to prevent the passage of electrical discharge between said envelope and said tube.

4. A luminous discharge tube, comprising an external transparent envelope, a cathode and an anode therein, a tube therein of different material than the external envelope, said tube being spaced from said envelope by means to prevent the passage of electrical discharge between said envelope and said tube, said means co-operating with said cathode and anode to maintain, while the tube is in operation, a resistance to the passage of electrical current between the external envelope and the internal quartz tube higher than the resistance through the quartz tube.

5. A luminous electrical discharge tube, comprising an external envelope, a cathode and an anode therein, a quartz tube so positioned that the electrical discharge between said cathode and said anode may pass through it, said quartz tube being electrically sealed with said external envelope by spaced electro-conductive elements between said tube and envelope and preventing any part of the discharge from passing between said tube and envelope.

6. Means for securing a quartz tube within a luminous discharge tube of glass, comprising three or more electrically conductive rings filling the space between the glass tube and the quartz tube at intervals along the lengths of the quartz tube thus forming in effect two or more small discharge tubes in series, the resistance of which to the starting and passage of electrical current is greater than the resistance between the main cathode and anode of the luminous tube than the quartz tube.

7. A luminous electrical discharge tube comprising an envelope, electrodes at opposite ends of said envelope, a tubular member within the envelope and of less diameter than the envelope, and means between the envelope and tubular member forming a plurality of short discharge tubes in series.

8. A luminous electrical discharge tube comprising an external envelope containing a rarefied gas, electrodes at opposite ends of said envelope, a tubular member within the envelope and of less diameter than the envelope, electro-conductive means between the envelope and the tubular member, the distance between said means and the wall of the envelope and between said means and the wall of the tubular member being of the order of the mean free path of the atoms of said gas.

RAYMOND R. MACHLETT.